(12) United States Patent
Brand et al.

(10) Patent No.: US 12,368,340 B2
(45) Date of Patent: Jul. 22, 2025

(54) ELECTRICAL CONDUCTOR WITH A SEALING BODY

(71) Applicant: BRUSS SEALING SYSTEMS GMBH, Hoisdorf (DE)

(72) Inventors: Manfred Brand, Tremsbüttel (DE); Jürgen Grundt, Neumünster (DE); Ralf Pielke, Seevetal (DE); Timo Besoke, Labenz (DE); Samuel Neumann, Ahrensburg (DE); Thomas Schrader, Hamburg (DE); Patrick Danberg, Hohenhameln (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 271 days.

(21) Appl. No.: 17/868,202

(22) Filed: Jul. 19, 2022

(65) Prior Publication Data
US 2023/0024874 A1 Jan. 26, 2023

(30) Foreign Application Priority Data

Jul. 20, 2021 (DE) .................... 10 2021 118 750.8
Jul. 4, 2022 (DE) ..................... 10 2022 116 605.8

(51) Int. Cl.
*H02K 5/10* (2006.01)
*H01B 3/46* (2006.01)
*H02K 5/22* (2006.01)

(52) U.S. Cl.
CPC ............. *H02K 5/10* (2013.01); *H01B 3/46* (2013.01); *H02K 5/225* (2013.01)

(58) Field of Classification Search
CPC ...... H02G 15/04; H02G 15/013; H02K 5/225; H02K 5/10; H01B 3/46
See application file for complete search history.

(56) References Cited

U.S. PATENT DOCUMENTS 2,225,472 A * 12/1940 Franklin ................ F16B 9/056
277/606
4,895,533 A 1/1990 Yagi et al.
(Continued)

FOREIGN PATENT DOCUMENTS

| DE | 39 04 069 A1 | 8/1989 |
| DE | 10 2018 109 863 B4 | 1/2020 |
| DE | 10 2019 219 377 A1 | 6/2021 |

OTHER PUBLICATIONS

Search Report issued by the German Patent and Trademark Office with respect to the German priority application No. 10 2021 118 750.8.

*Primary Examiner* — Timothy J Thompson
*Assistant Examiner* — Amol H Patel
(74) *Attorney, Agent, or Firm* — SALIWANCHIK, LLOYD & EISENSCHENK

(57) ABSTRACT

The invention relates to an electrical conductor for conducting electric current through a housing part, wherein the electrical conductor is enclosed on a first sealing section by a sealing body made of an elastic material, wherein the electrical conductor and the sealing body have an integrally-bonded connection. The electrical conductor has, at least in the first sealing section, an outer contour which is rounded in cross-section. The invention further relates to a method for producing an electrical conductor with a sealing body, which is connected by integral bonding and is made of an elastic material.

15 Claims, 8 Drawing Sheets

(56) References Cited

U.S. PATENT DOCUMENTS

| 5,861,577 A | * | 1/1999 | Tamura | F16L 5/10 |
| | | | | 174/50.56 |
| 2018/0097344 A1 | * | 4/2018 | Daga | H01B 7/285 |
| 2021/0233686 A1 | * | 7/2021 | Paletko | H01B 17/583 |

* cited by examiner

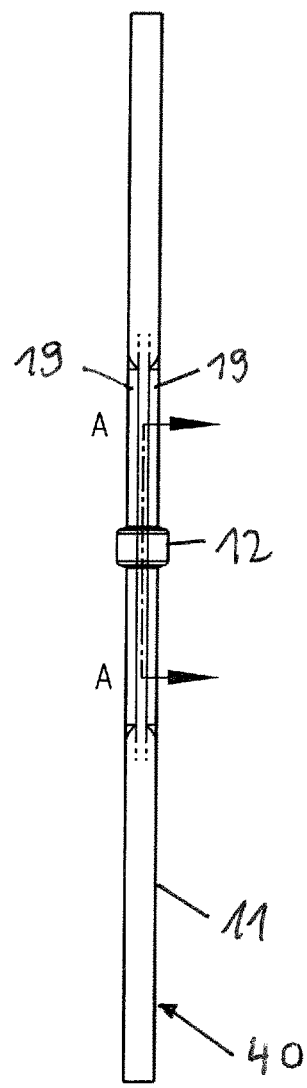
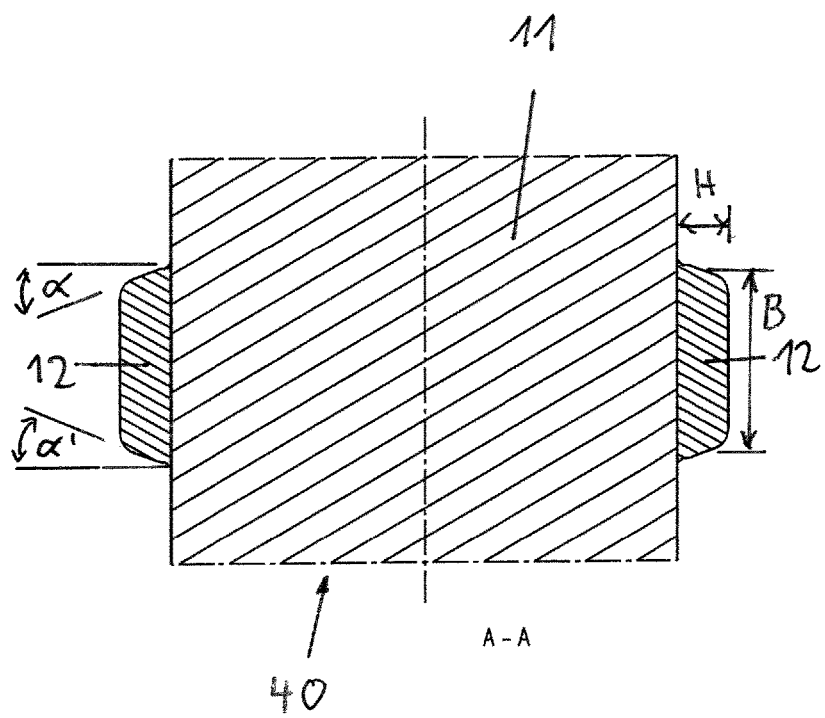
Fig. 11
Fig. 12

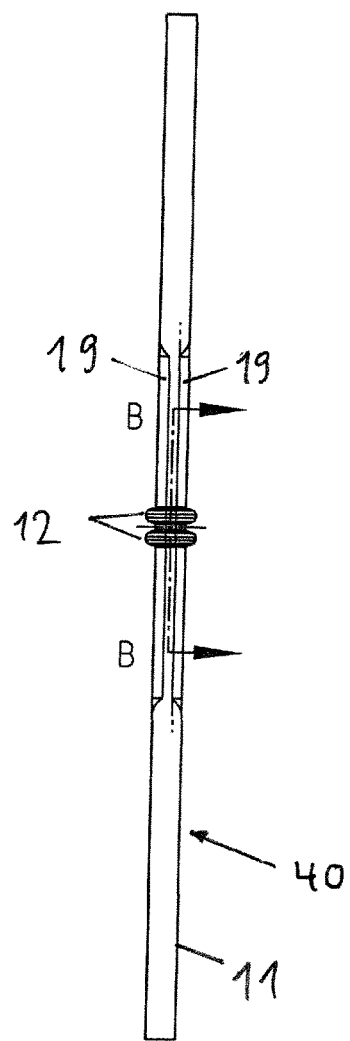
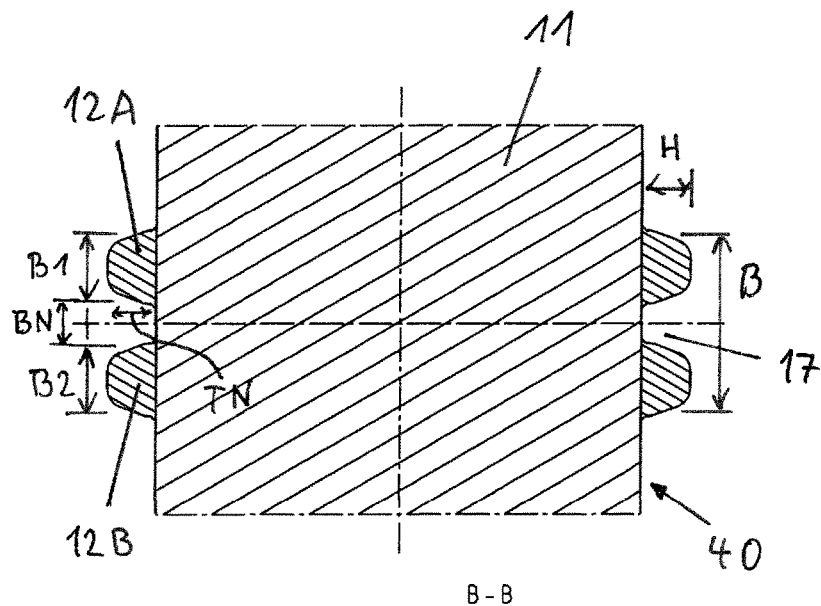

Fig. 17
Fig. 18
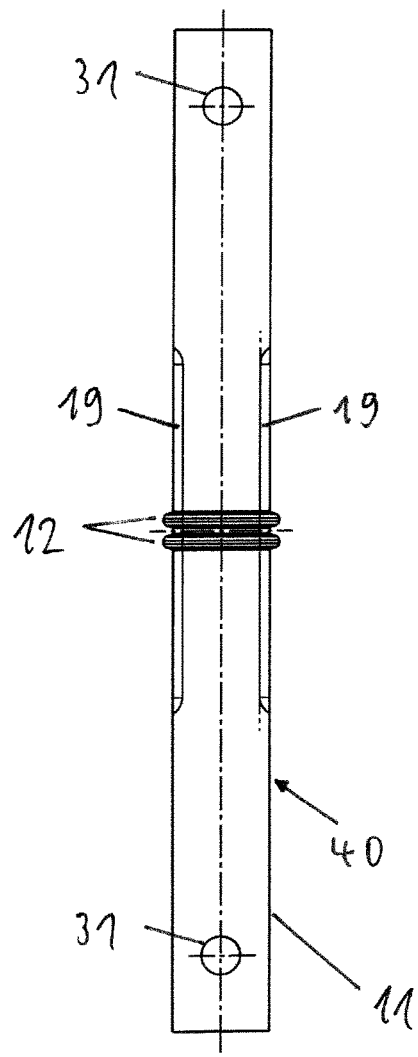
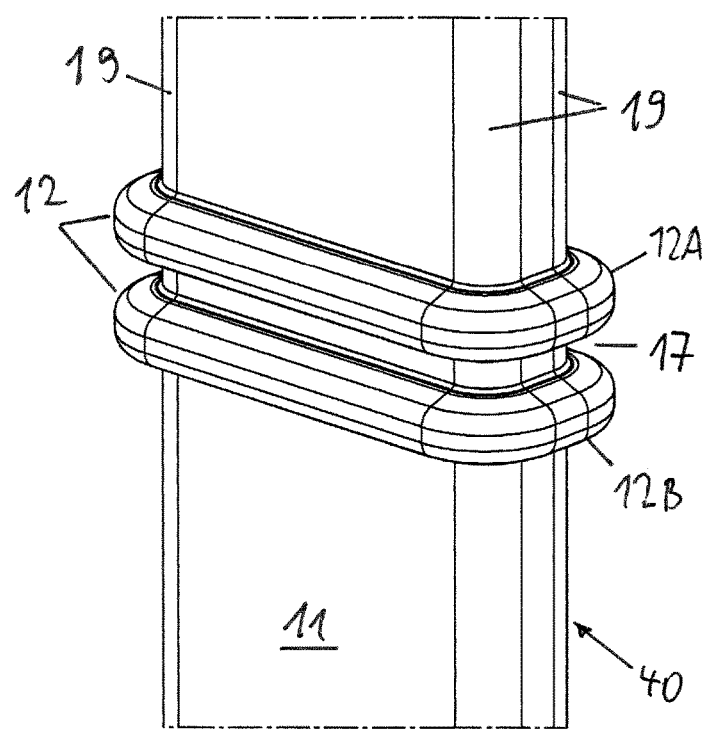

ELECTRICAL CONDUCTOR WITH A SEALING BODY

CROSS-REFERENCE TO RELATED APPLICATIONS

This application claims priority to German Patent Application No. 10 2021 118 750.8, filed on Jul. 20, 2021; and German Patent Application No. 10 2022 116 605.8, filed Jul. 4, 2022; both of which are incorporated in their entirety herein.

FIELD OF THE INVENTION

The present invention relates to an electrical conductor for conducting electric current through a housing part according to the preamble of claim 1, and to a corresponding method of manufacture.

BACKGROUND OF THE INVENTION

In electric motors and generators, several electrical conductors or conductor bars are generally to be fed through a housing wall which separates two spaces—for example, a housing of an electric motor and a housing of a power electronics unit or the environment. The feeding through of the conductor serves to transmit electrical power between the respective spaces, wherein, at the same time, there is a requirement for the seal to be as good as possible against liquid media, e.g., oil, in order to prevent oil, for example, from ingressing or creeping towards a power electronics unit.

Flow path extensions, for example, in the form of corrugations and labyrinthine structures in the fed-through conductor, which generally consists of copper or a copper alloy, are known from the prior art to improve sealing. The flow path extensions are intended to prevent or at least significantly impede an infiltration of oil between the conductor and a cast plastic which forms the housing wall. It has been found that such a use of flow path extensions does not constitute sufficient sealing against oil.

DE 10 2018 109 863 B4 discloses a multi-component seal for sealing a bar—in particular, a busbar for an onboard electrical system of a motor vehicle—with respect to a housing.

DE 39 04 069 A1 discloses a watertight plug for an electrical plug connection in a motor vehicle.

DE 10 2019 219 377 A1 discloses an arrangement for sealing a busbar—in particular, for an onboard electrical system of a motor vehicle—with respect to a housing.

U.S. Pat. No. 2,225,472 A discloses an insulating and strain relief bushing for an electric cable.

BRIEF SUMMARY

It is the aim of the present invention to provide a feed-through for an electrical conductor through a housing which enables improved sealing—in particular, with respect to oil—and a corresponding method of manufacture.

The aim is achieved by the features of the independent claims. To accomplish the aim, an electrical conductor for conducting electric current through a housing part is proposed, wherein the electrical conductor is enclosed on a first sealing section by a sealing body made of an elastic material, wherein the electrical conductor and the sealing body have an integrally-bonded connection.

DETAILED DESCRIPTION

According to the invention, the electrical conductor has, at least in the first sealing section, an outer contour, which is rounded in cross-section. As a result, leaks due to microgaps or micronotches, which cannot be avoided during production, as well as voltage excesses, are avoided at sharp edges of the electrical conductor.

To achieve this advantage, the outer contour in the cross-section of the electrical conductor, at least in the sections mentioned, preferably has curvatures with a radius of at least 0.1 mm, preferably at least 0.4 mm, and more preferably at least 0.7 mm. Preferably, the roundings in the cross-section of the outer contour have a maximum radius which corresponds to half the minimum extension of the electrical conductor—for example, half the material thickness.

The electrical conductor can have an outer contour that is rounded in cross-section over its entire length. In other embodiments, the electrical conductor can have an outer contour, which is angular, i.e., not rounded, in cross-section, at one or both ends.

The integrally-bonded connection between the electrical conductor and the elastic material of the sealing body can be effected, for example, by vulcanization or scorching of the elastic material of the sealing body or of a sealant. By vulcanizing the elastic material—preferably an elastomer, and more preferably a rubber—a bonding or connection between the elastic material and the conductor—preferably made of metal, e.g., copper or copper alloy—can be created, which facilitates improved sealing—in particular, improved microgap sealing. In advantageous embodiments, the elastic material can be injected around the first sealing section of the conductor—for example, in an injection-molding process.

The sealing of the electrical conductor—in particular, against oil—is significantly improved by the vulcanized sealing body. The elastic material of the sealing body is preferably electrically insulating. Accordingly, electrical insulation against a housing part can be achieved by the sealing body. Furthermore, mechanical vibrations of the electrical conductor can be damped and/or decoupled by the sealing body. As a result of the elastic material of the sealing body, it is also possible to compensate for different coefficients of thermal expansion of the materials and thermal expansion differences in the case of an inhomogeneous temperature distribution, whereby temperature-related stresses can be avoided.

The conduction of the electric current through a housing part relates to the conduction from one side of the housing part to the other side; the electric current flows through the conductor, and not through the substance of the housing itself. The sealing body is preferably electrically insulating and has corresponding dimensions, so that neither breakdown and/or flashover nor significant creepage currents can occur with respect to a housing part, which can be made of metal, for example. The dimensions, diameters, and/or distances are a function here of the maximum voltage.

According to a further development, it is proposed that the conductor on the first sealing section or on the first and second and/or third sealing sections, which each adjoin the first sealing section on one side, have a rounded cross-section. A rounded cross-section therefore does not have any sharp edges, for example, so that, in the case of a rectangular conductor cross-section of a conductor bar or busbar, the edges in particular are rounded, with an adequate radius. An adequate radius can be 1 mm, for example. As a result, the notch effect can be reduced by a more uniform distribution of the tension or sealing force of the elastic material on the rounded conductor, and the sealing effect and the wetting can be improved. In addition to the first sealing section, the second and/or third sealing section can also be rounded.

The electrical conductor therefore preferably also has, at least in a sealing section between the housing part and the electrical conductor—insofar as such a sealing section is provided—an outer contour rounded in cross-section, since leaks are also to be avoided in a contact region between the housing part and the electrical conductor through microgaps or micronotches, which are unavoidable during production, and voltage excesses are also to be avoided.

It is further proposed that the elastic material of the sealing body be an elastomer that is impermeable to oil. This improves the sealing against oil—in particular, the sealing against a creepage of oil through the material of the sealing body. At the same time, an improved media resistance of the elastic material results.

According to a further development, it is proposed that the elastic material of the sealing body consist of a combination of several elastomers, which are connected to one another in layers. This can be used, for example, to adjust advantageous material properties in the combination and/or to reduce the proportion of expensive elastomers, while maintaining adequate properties.

In an advantageous embodiment, the elastic material of the sealing body has a barrier layer made of a fluorothermoplastic—in particular, polytetrafluoroethylene (PTFE). The barrier layer can be applied to the further parts of the sealing body, e.g., also in the form of a film—in particular, a PTFE film.

According to a further development, it is proposed that the sealing body have at least a proportion of fluorinated rubber (FKM), ethylene acrylate rubber (AEM), acrylate rubber (ACM), acrylonitrile butadiene rubber (NBR), chloroprene rubber (CR), ethylene propylene diene rubber (EPDM), and/or hydrogenated nitrile rubber (HNBR), or consist predominantly, i.e., with a weight fraction of at least 50%, and preferably at least 75%, or completely of one of the aforementioned materials. The materials mentioned enable a good bonding to a metallic conductor—in particular, copper—and/or a good impermeability—in particular, to oil—wherein ethylene propylene diene rubber (EPDM) is suitable for liquid media other than oil, and a sufficient temperature range for use in the automotive field.

According to a further development, it is proposed that the sealing body have on its outer side at least one circumferential groove and/or at least one latching hook and/or at least one stop.

The outer side is here arranged on the conductor opposite the first sealing section. The latching hook can also have, for example, a chamfer—in particular, a circumferential chamfer—as an insertion aid, so that the sealing body can be inserted into an opening of a housing part in a simple manner.

The at least one groove can be rounded, for example, resulting in a concave circumferential channel in the sealing body. The groove can increase the sealing surface with respect to the housing part, which has a positive effect on the sealing effect. In possible embodiments, a plurality of circumferential grooves can be provided. Furthermore, the entire outer surface of the body that is connected by integral bonding can be rounded, in order to achieve the most uniform possible pressure distribution between the sealing body and the housing part. The at least one groove can also be a relief groove, for example. If several grooves are provided, a sealing bead can be formed between two circumferential grooves.

A stop on the sealing body can limit the insertion movement during insertion into an opening of a housing part, for example.

In an alternative embodiment, the sealing body can also be embodied without concave surfaces on the outer side. This results in a comparatively smooth shape of the sealing body on the outer side.

It is further proposed that the electrical conductor be fed through an opening in a housing part, wherein the sealing body fixes the electrical conductor in the opening of the housing part.

The sealing body can therefore feed and seal the electrical conductor in the housing and also accept a tolerance and/or movement compensation. In one possible embodiment, the sealing between the sealing body and the housing part is effected by means of a sealing pressure, with elastic deformation of the elastic material of the sealing body relative to the housing part. For example, three electrical conductors with a sealing body connected by integral bonding can be fed through a housing part.

According to a further development, it is proposed that the sealing body be supported on the inner surface of the opening and on both sides of the housing part. The sealing body is preferably inserted with the conductor into the opening, so that the electrical conductor is held in the opening of the housing part by the insertion, and the sealing body seals the opening. The sealing body is preferably only partially inserted—in particular, with a part of the sealing body, which has an insertion aid in the form of a chamfer and/or a latching hook. The sealing body and the conductor can therefore be fed through the opening with elastic deformation of the elastic material of the sealing body, wherein the sealing body fixes the conductor in the opening by positive locking and elastic pretensioning. Supporting the sealing body on the inner surface of the opening, which is preferably rounded, and on the two sides of the housing part enables the conductor to be fixed in all spatial directions. The two sides of the housing part correspond in particular to the two spaces to be separated.

In an advantageous embodiment, the sealing body on the conductor extends further along the conductor on one side or on both sides of the first sealing section. In this embodiment, the elastic material is extended in at least one direction, whereby the elastic material can assume further insulation tasks—in particular, an electrical insulation.

According to a further development, it is proposed that the conductor be fed through a housing part, wherein the sealing body is completely enclosed by the housing part and, on the first sealing section, by the conductor, wherein the housing part completely encloses the conductor in a second and a third sealing section, each of which adjoins the first sealing section on one side.

The sealing and the mechanical stability can be further improved by the enclosure with the housing part. The enclosure can be improved significantly, for example, by overmolding with a plastic to form the housing part.

The sealing body, which is connected by integral bonding, or the elastic material thereof is completely enclosed by the housing part on the further surfaces which are not connected to the conductor. In this way, on the one hand, the sealing surface to the housing part is effectively utilized and, on the other, the sealing body in this embodiment can be kept free of mechanical loads. The sealing site between the elastic material of the sealing body and the housing part, which is made of plastic for example, achieves sufficient sealing against the infiltration of oil. It is particularly advantageous thereby for the elastic material of the sealing body to form a chemical bond with a plastic of the housing.

Three electrical conductors, for example, can be fed through one housing part. Where a plurality of electrical conductors are fed through, the conductors are preferably each individually enclosed by a vulcanized sealing body in the first sealing section. In possible embodiments, a plurality of electrical conductors that are fed through are enclosed in each case by a vulcanized sealing body on the first sealing section, wherein the sealing body enclosing the plurality of conductors is embodied so as to be cohesive.

It is further proposed that the housing part consist of an unfilled or filled plastic. The plastic is preferably impermeable—preferably to oil. The plastic can, for example, be a thermoplastic. Furthermore, the plastic is preferably low-halogen or halogen-free, and thus suitable for installation with electrical circuit boards and sensors. Advantageous fillers for the filled plastic can, for example, be glass fibers—in particular, short fibers—and/or glass beads. A glass-fiber-reinforced and/or glass-bead-reinforced plastic achieves good mechanical properties or is in particular suitable as an electrical insulator with respect to the conductor that is fed through. The filler material of the filled plastic is preferably a non-conductive material.

It is further proposed that the housing part have a static housing seal for sealing with a further housing part.

As a result, the housing part can, advantageously, be used for the impermeable separation of two spaces. The housing part can, for example, seal a space or a housing, or separate two spaces or two housings from one another. The static housing seal can preferably be compressed for this purpose via the housing part. For example, by screwing and/or clipping the housing part onto a further housing, sufficient contact pressure can be achieved on the static housing seal, enabling a sufficient sealing effect to be established.

In an advantageous embodiment, the housing seal consists of fluorinated rubber (FKM). This facilitates an impermeable housing seal, which has sufficient elasticity even at low temperatures when a low-temperature fluorinated rubber is selected—preferably with a low glass transition temperature.

The electrical conductor described above and a sealing body made of an elastic material integrally connected to the electrical conductor together form a composite component. In a preferred embodiment, the sealing body is trapezoidal in a longitudinal section through the electrical conductor, which design has been found to be advantageous in terms of sealing effect and ease of manufacture. In said embodiment, at least one angle of inclination of the trapezoidal sealing body is preferably in the range between 10° and 40°.

Furthermore, to achieve the aim, a method with the following steps for the production of an electrical conductor having a sealing body made of an elastic material and connected by integral bonding is proposed:

Vulcanizing a sealing body made of an elastic material onto a first, circumferential sealing section of the electrical conductor.

The vulcanization comprises in particular the application of the unvulcanized sealant or elastic material of the sealing body—preferably rubber—in the region of the first sealing section on the at least one electrical conductor. The application can take place, for example, by overmolding the electrical conductor in an injection-molding process. In the case of vulcanization, covalent chemical bonds are created in the sealant, whereby the elastic or elastomer properties of the sealant can be formed. Since the sealant is in contact with the surface of the conductor in the first sealing section during vulcanization or during scorching, a particularly tight—in particular, microgap-tight—bonding of the sealant or of the elastic material of the sealing body to the conductor can be created.

According to a further development, the following step is proposed:

Rounding the cross-section of the conductor on the first sealing section or on the first and second and/or third sealing sections for the pretreatment of the electrical conductor prior to vulcanization.

Furthermore, in an advantageous embodiment, the following step is proposed:

Compressed air blasting, using a solid blasting abrasive, of the conductor on the first sealing section or on the first and second and/or third sealing sections for the pretreatment of the electrical conductor prior to vulcanization.

The compressed air blasting using a solid blasting agent is preferably carried out after rounding. It is used to pre-treat the conductor to clean the surface and establish an advantageous roughness. At the same time, sharp edges or ridges on the conductor can be removed. The compressed air blasting preferably takes place with corundum as solid blasting agent, so that a high surface roughness of the conductor, which is made of copper or a copper alloy for example, can be achieved, with which surface roughness a good mechanical bond and an enlarged contact surface can be achieved.

According to a further development, the following step is proposed:

Applying an adhesion agent to the first sealing section to pre-treat the electrical conductor prior to vulcanization.

The adhesion agent also serves for pretreatment of the conductor, and the application is preferably carried out after a rounding and, further preferably, after compressed air blasting with solid blasting abrasives. The rounding and the compressed air jets can improve the application of the adhesion promoter—in particular, the wetting of the surface. The adhesion promoter can further improve the bond between the conductor in the first sealing section and the sealant, so that a particularly impermeable seal can be achieved.

The following step is proposed in a possible advantageous embodiment:

Tempering the vulcanized sealant for post-treating the sealing body after vulcanization.

With some possible elastic materials or sealants, the tempering can be advantageous, in order to fully complete the vulcanization process, for example. In possible embodiments, the tempering can be omitted if the property profile of the sealant achieved is already sufficiently good during the vulcanization process.

According to a further development, the following step is proposed:

Inserting the sealing body with the enclosed conductor into an opening of a housing part, with at least elastic deformation of the sealing body.

This quickly and easily produces a mechanical and sealing connection between the sealing body, which is integrally bonded to the conductor, and the housing part. The electrical conductor can therefore be inserted into a housing part with an opening, e.g., made of metal, so that an oil-tight feeding of an electrical conductor through a plurality of conceivable housing parts is possible.

According to an alternative development, the following step is proposed:

Overmolding of the sealing body, which is vulcanized on the conductor on the first sealing section, and of the electrical conductor in a second and a third sealing section, which in each case adjoin the first sealing section on one side, with a plastic to form a housing part.

The overmolding with a plastic is carried out after vulcanization—for example, in an injection-molding process. In possible embodiments, vulcanization cannot be fully completed before the overmolding with a plastic, so that the plastic can ideally form a bond with the elastic material of the sealing body. The plastic of the housing is preferably a thermoplastic, wherein fillers can be provided in the plastic.

When the sealing body is overmolded with the material of the housing part, e.g., in an injection-molding process, the vulcanized, elastomer sealant or the elastic material of the sealing body can be deformed as a function of the pressure during the injection-molding process, as a result of which, restorative forces can be formed between the sealing body and the housing part, which improve the sealing effect.

Furthermore, the following step is proposed:

Applying a further adhesion promoter to the vulcanized sealing body for post-treating the sealing body after vulcanization and before overmolding.

As a result, an advantageous bonding of the vulcanized, elastomer sealant or of the elastic material of the sealing body to the plastic of the housing, by means of which the sealing body is subsequently overmolded in said embodiment, can be achieved. The microgap-tight feedthrough of the at least one electrical conductor through the housing part made of plastic can, advantageously, be carried out by means of the corresponding bond. The further adhesion agent to be applied after vulcanization can be the same adhesion agent which is applied to the conductor in the first sealing section or an alternative adhesion agent.

Furthermore, the following step is proposed:

Plasma coating of the vulcanized sealing body for the post-treatment of the sealing body after vulcanization and before overmolding.

A plasma coating can be used to improve the bonding of the plastic of the housing part to the elastic material of the sealing body or the elastomer sealant, so that an improved sealing effect is established at this sealing site.

According to a further development, the following step is proposed:

Tempering the housing part for the post-treatment of the sealing body after vulcanization and after overmolding.

The tempering of the housing part with the at least one electrical conductor can, for example, improve the bond and thus the sealing effect between the elastic material of the sealing body and the plastic of the housing part. This is particularly advantageous if an aftertreatment of the elastic material or of the elastomer sealant is carried out using an adhesion agent and/or a plasma coating. Furthermore, the tempering of the housing part can have a positive effect on the bond between the vulcanized, elastic material or elastomer sealant and the conductor. It is also conceivable to complete an incomplete vulcanization process of the sealant by tempering the housing part, wherein the bond between the sealant or elastic material and the housing part and/or the bond between the sealant and the conductor can be improved, which increases the sealing effect. With a housing part made of a thermoplastic material, tempering is preferably carried out below the melting temperature of the plastic.

BRIEF DESCRIPTION OF THE FIGURES

The invention is explained below using preferred embodiments with reference to the accompanying figures. Shown are:

FIG. 11 a view of the narrow side of a composite component;

FIG. 12 a longitudinal section through the composite component according to FIG. 11 in the region of the sealing body 12;

FIG. 15 a view of the narrow side of a composite component in a further embodiment;

FIG. 16 a longitudinal section through the composite component according to FIG. 15 in the region of the sealing body 12;

FIG. 17 a view of the wide side of the composite component according to FIGS. 15 and 16; and FIG. 18 a perspective view of the composite component according to FIGS. 15-17 in the region of the sealing body 12.

FIG. 1 shows an exemplary embodiment of an electrical conductor 11 with a sealing body 12, which is connected by integral bonding and made of an elastic material, in a side view. The sealing body 12 preferably has several circumferential grooves 17, between which two sealing beads 22 are formed. The grooves 17 can serve, for example, as relief grooves. In the illustration of FIG. 1 on the left, the sealing body 12 has a latching hook 20 with an insertion aid; therefore, the electrical conductor 11 with the sealing body 12, which is connected by integral bonding, can easily be inserted into an opening 23 of a housing part 10 (see FIG. 3), with elastic deformation of the sealing body 12. The insertion is limited by a stop 21 of the sealing body 12, which can be seen on the right in FIG. 1. The axial contact area between the sealing body 12 and the electrical conductor 11 along the longitudinal axis L of the elongate electrical conductor 11 defines the first sealing section 13 (see below).

Figure 1:
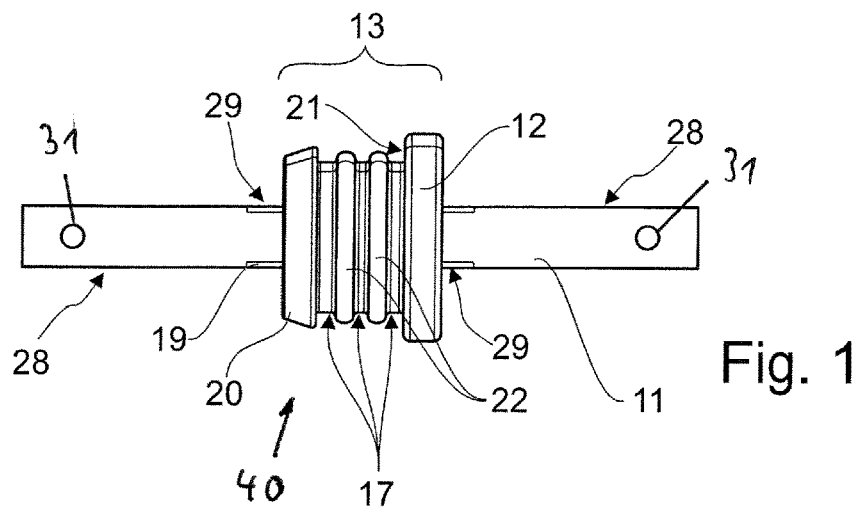
FIG. 1 a side view of an electrical conductor with a sealing body connected by integral bonding.
Figure 2:
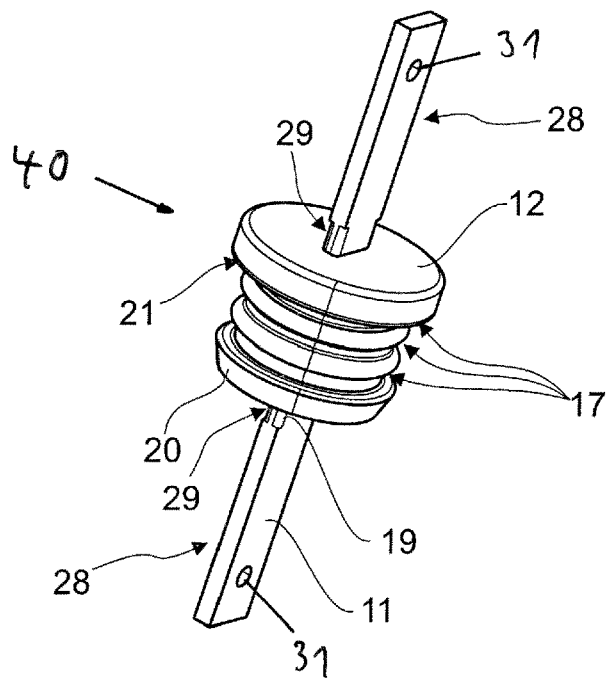
FIG. 2 an isometric view of an electrical conductor with a sealing body connected by integral bonding.

The electrical conductor 11 with the sealing body 12, which is connected by integral bonding and made of an elastic material—preferably an elastomer, and more preferably a rubber—is shown in FIG. 2 in an isometric view. In this illustration, the rectangular cross-section of the electrical conductor 11 can be seen, which consists of metal—in particular, copper. In the region of a first sealing section 13, which is enclosed by the sealing body 12, as well as on the sections adjoining the side, the conductor 11 has roundings 19 at the edges, as a result of which the notch effect in the sealing body 12 is reduced, and wetting during the production of the integral bond between the sealing body 12 and the conductor 11 is improved.

Figure 3:
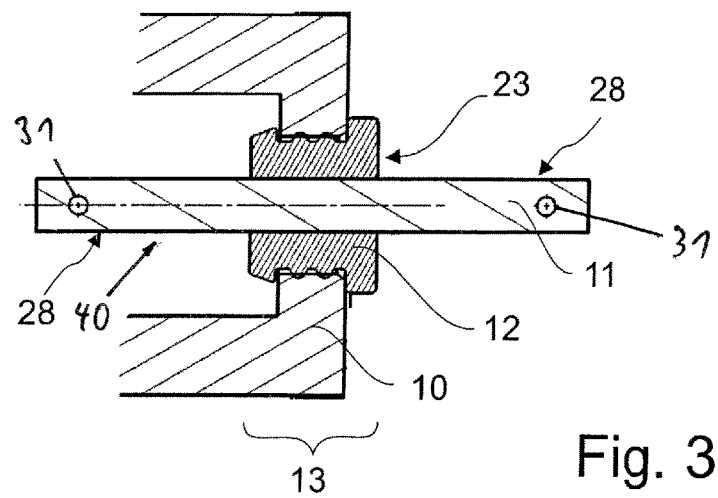
FIG. 3 a sealing body, with an electrical conductor, inserted into an opening of a housing part under elastic deformation.

In the illustration in FIG. 3, the electrical conductor 11 with the sealing body 12 is inserted into an opening 23 of a housing part 10 with elastic deformation. The sealing body 12 thus abuts against the inside of the opening 23 with the sealing beads 22 with a contact pressure from the elastic deformation, as a result of which a sufficient sealing effect is achieved. Furthermore, the stop 21 of the sealing body 12 rests on one side of the housing part 10, which, for example, can face a stator space of an electric motor and/or an oil or media side. The latching hook 20 abuts against the other side of the housing part 10, which can be associated with a space of a power electronics unit, for example. The sealing bodies 12 is thus locked and fixed in the opening 23, the latter holding the electrical conductor 11, which was fed through the housing part 10, in position by the restorative forces of the elastic material. At the same time, the sealing body 12 seals the conductor 11 with respect to the housing part 10.

In one possible embodiment, for example, three conductors 11 can each have an integrally-bonded sealing body 12 and be inserted through three openings 23 in a housing part 10.

In a further exemplary embodiment, three conductors 11 can be integrally bonded to a common sealing body 12, which encloses the three conductors 11 in each case. Said sealing body 12 with three conductors 11 can preferably be inserted into an opening 23 of a housing part 10 in order to achieve a sealed feedthrough of the three electrical conductors 11 through a housing part 10.

Figure 4:
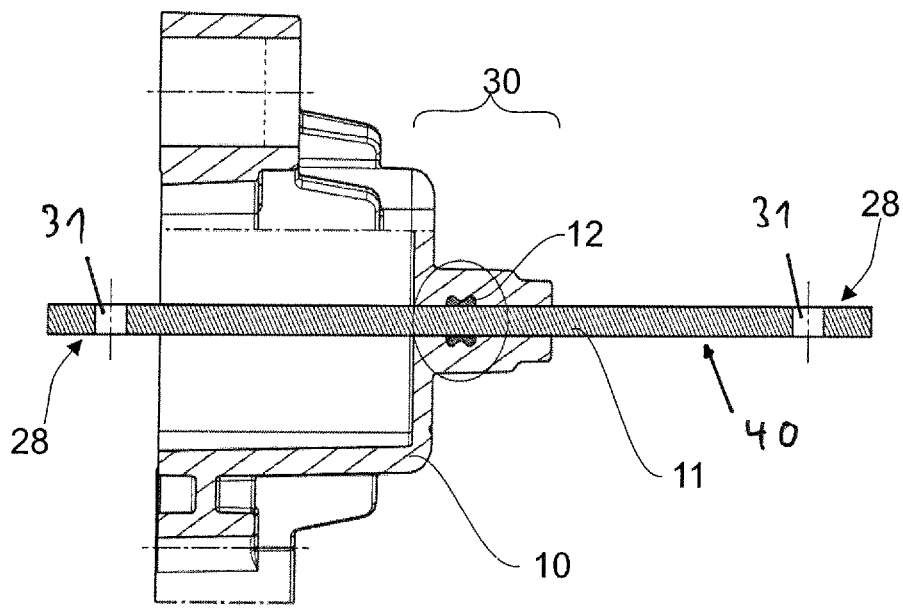
FIG. 4 a sectional view of a housing part with a fed-through electrical conductor with a sealing body.

FIG. 4 shows a further advantageous exemplary embodiment of a housing part 10 with a fed-through electrical conductor 11 in a sectional view. In this exemplary embodiment, the electrical conductor 11 is a conductor bar made of copper with a substantially rectangular cross-section, which has rounded edges or roundings 19 at least in the region of the feedthrough. In alternative embodiments, the electrical conductor 11 can also have a circular or oval cross-section. The conductor 11 thus represents an electrical connection—for example, for transmitting power to an electric motor between the two sides of the housing part 10. The housing part 10 separates, for example, two spaces or two housings so as to be microgap-tight, such that creepage or permeation of oil through the housing part 10 is not possible. For this purpose, the fed-through conductor 11 is enclosed in a sealing section 13 by a vulcanized, elastomer sealant or elastic material of a sealing body 12. The axial contact region between the housing part 10 and the electrical conductor 11 along the longitudinal axis L of the electrical conductor 11 defines the sealing section 30 and the second and third sealing sections 14, 15 (see below).

Figure 5:
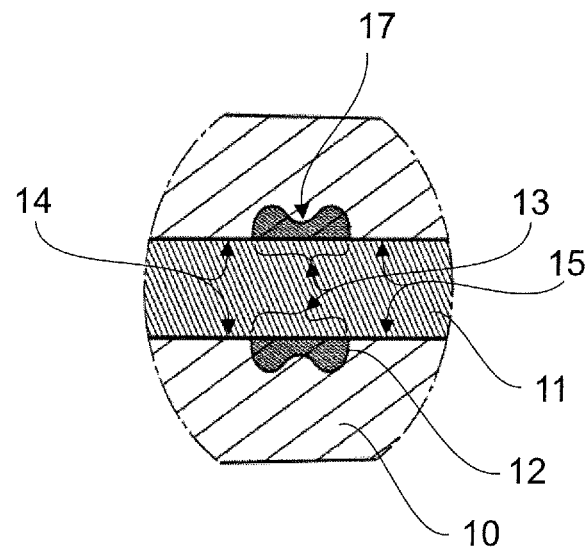
FIG. 5 a detail view of a vulcanized and enclosed sealing body of a feedthrough of a conductor through a housing part.

FIG. 5 shows a detail view of said feedthrough in section. The vulcanized, elastomer sealing body 12 surrounds or encases the electrical conductor 11 in the region of the first sealing section 13, wherein an impermeable sealing site has been created between the sealing body 12 and the conductor 11 by the vulcanization. The sealing body 12 is completely enclosed outside the first sealing section 13 by the housing part 10, so that the sealing body 12 in this exemplary embodiment has no direct contact with the two spaces to be separated and is arranged in a protected manner in the housing part 10 itself. In FIGS. 4 and 5, a second sealing section 14 on the left and a third sealing section 15 on the right are shown laterally next to the first sealing section 13. In relation to the conductor 11, the second and third sealing sections 14, 15 in each case adjoin directly on one side of the first sealing section 13. In contrast to the first sealing section 13, the conductor 11 is completely enclosed by the housing part 10 in the second and third sealing sections 14, 15. As a result, the sealant 12 is fixed at the first sealing site 13 and protected. Furthermore, an additional sealing effect is thereby achieved, and mechanical loads between the conductor 11 and the housing part 10 can be transmitted via the second and third sealing sections 14, 15, so that the elastic material of the sealing body 12 or the elastomer sealant, which preferably has a lower modulus of elasticity than the housing part 10, is kept largely free of mechanical loads.

Furthermore, in the exemplary embodiment of FIG. 5, a circumferential groove 17 can be seen in the vulcanized sealing body 12, which groove 17 preferably is run perpendicularly in a plane by feeding the conductor 11 through. The groove 17 is rounded, and therefore no sharp edges result due to the groove 17. The groove 17 is filled by the housing part 10, so that the sealing body 12 is enclosed by the housing part 10 outside the first sealing section 13. Furthermore, as can be seen in FIGS. 4 and 5, the sealing body 12 is also rounded, so that a kind of butterfly shape results in the sectional view.

Figure 6:
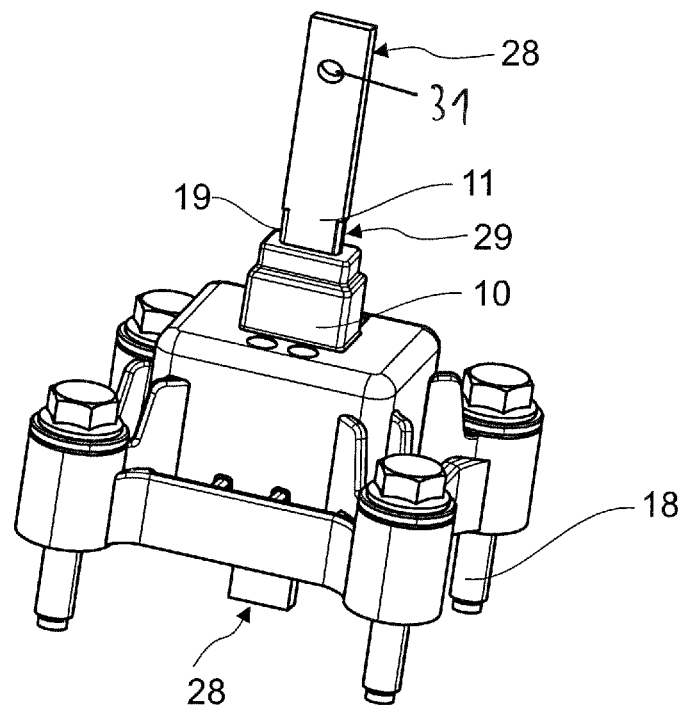
FIG. 6 a housing part with a fed-through conductor in a side view.

FIG. 6 shows the housing part 10 with a fed-through electrical conductor 11 of FIG. 4 in a side view. Furthermore, four screws 18 are provided, by means of which the housing part 10 can be fastened to a housing in order to close said housing, for example. Furthermore, the rounding 19 of the conductor 11 can be seen in a free section of the conductor 11. Particularly when producing a housing part 10 by means of an injection-molding process, the rounding 19 can be advantageous, in order to achieve improved pressing or sealing with respect to the injection molding. An insulating plastic film on the further portions of the conductor 11 is therefore also avoided.

Figure 7:
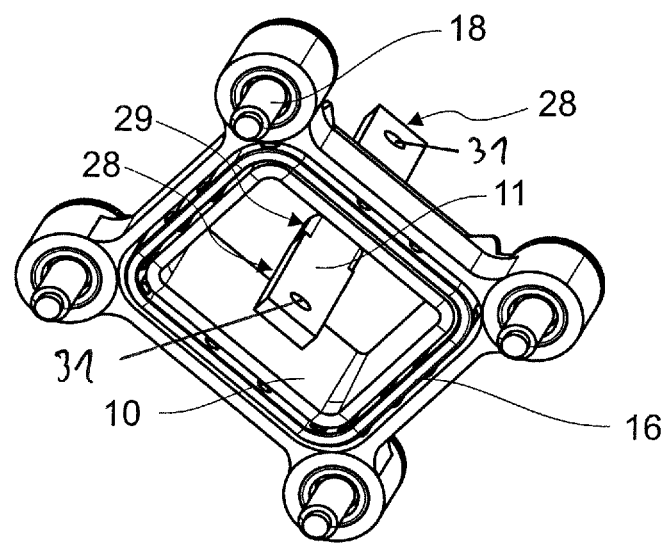
FIG. 7 a housing part with a fed-through conductor in a view from below.

FIG. 7 shows an inserted static housing seal 16 which can be pressed onto a further housing by means of the four screws 18, so that an impermeable sealing of a housing or of a space relative to the surroundings or a space can be achieved.

Figure 8:
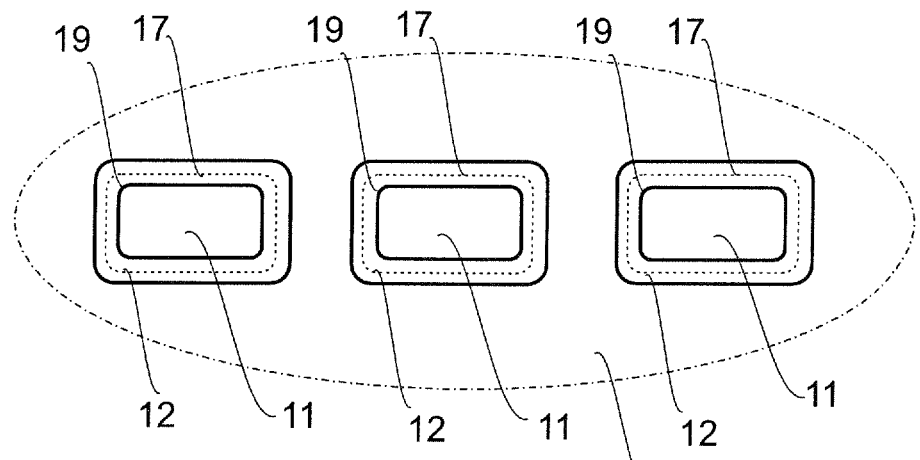
FIG. 8 a sectional view through a housing part with three fed-through conductors.

FIG. 8 shows an exemplary embodiment of a housing part 10 with three, fed-through, electrical conductors 11 in a sectional plane in the housing part 10 perpendicular to the feedthrough of the conductors 11. The three conductors 11 have a rectangular cross-section with roundings 19 on the four edges. The vulcanized sealing body 12 completely or annularly surrounds the conductors 11 individually in each case. Furthermore, the circumferential groove base of the groove 17 can be seen.

Figure 9:
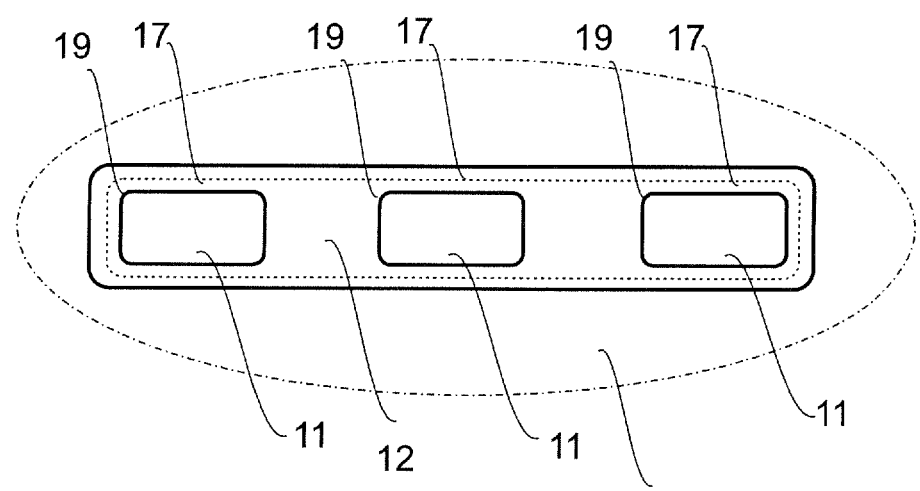
FIG. 9 a further sectional view through a housing part with three fed-through conductors.

FIG. 9 shows a further exemplary embodiment of a housing part 10 with three, fed-through, electrical conductors 11, wherein the three, fed-through, electrical conductors 11 are each enclosed on the first sealing section 13 by a sealing body 12 connected by integral bonding, wherein the sealing body 12 surrounding the three conductors 11 in each case is cohesive or of one piece.

Figure 10:
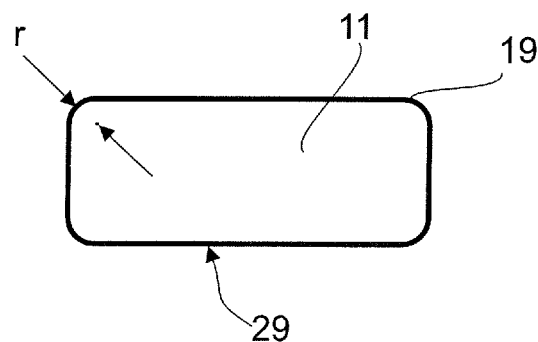
FIG. 10 a cross-sectional view through the electrical conductor in the contact region with the sealing body and/or in the contact region with the housing part.
Figure 13:
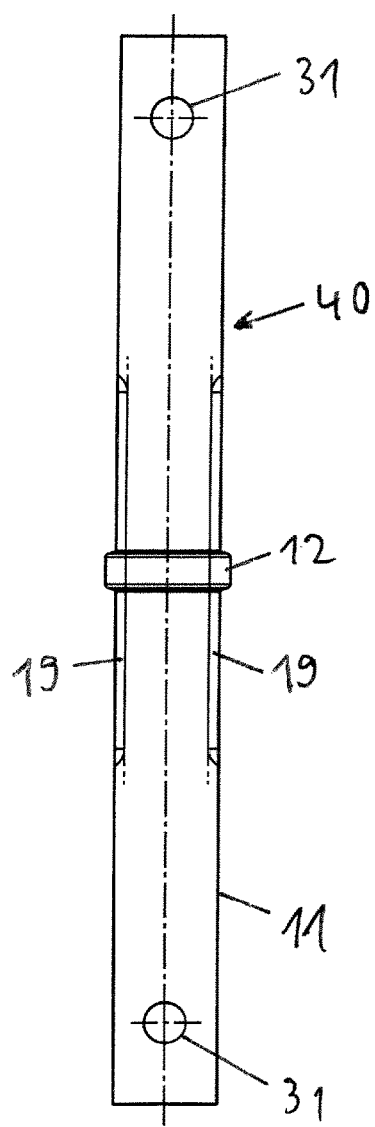
FIG. 13 a view of the wide side of the composite component according to FIGS. 11 and 12.
Figure 14:
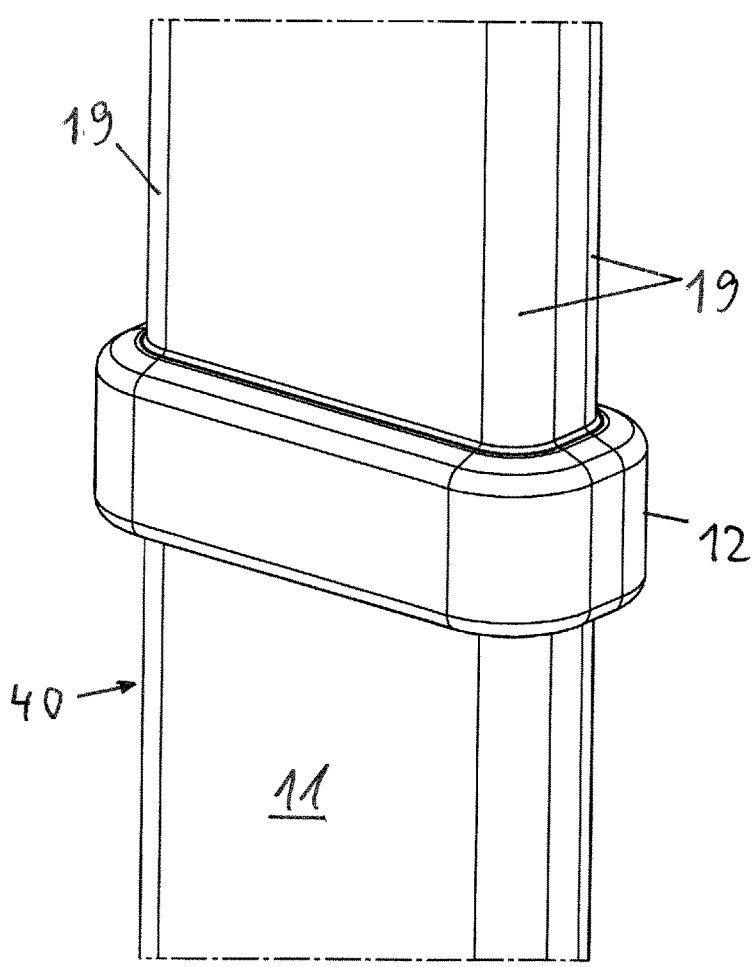
FIG. 14 a perspective view of the composite component according to FIGS. 11-13 in the region of the sealing body 12.

FIG. 10 shows a cross-section through the electrical conductor 11 in the region of the first sealing section 13 and/or in the region of the sealing section 30. In this case, the conductor 10 has a substantially rectangular outer contour 28 with rounded edges 19. The curvatures of the outer contour 29 have a radius r of at least 0.1 mm, preferably at least 0.4 mm, more preferably at least 0.7 mm, and even more preferably at least 1 mm. In advantageous exemplary embodiments, the roundings or curvatures in the cross-section of the outer contour have a maximum radius which corresponds to half the minimum extension of the electrical conductor—for example, half the material thickness of a conductor bar.

The general shape of the conductor 10 in the region of the first sealing section 13 and/or in the region of the sealing section 30 does not have to be rectangular, as in FIG. 10. Any suitable shape is possible, e.g., round, oval, elliptical, polygonal with rounded edges. However, all curvatures in the outer contour 29 have a radius of at least 0.1 mm. In other words, the outer contour 29 cannot describe any curvature with a radius of less than 0.1 mm, because this would lead to disadvantageously sharp edges.

The electrical conductor 11 can have a rounded outer contour 29 over its entire length, as described. However, this is not necessarily the case. In particular, the electrical conductor 11 at one or both ends, as shown in FIGS. 1-4, 6, 7, can have an outer contour 28 which is angular, i.e., not rounded—for example, rectangular—in cross-section, with radii smaller than 0.1 mm. This can be advantageous if the production of the rounding 29 requires an additional processing step, which can then be omitted in the non-rounded regions.

Further advantageous embodiments of a composite component 40 comprising an electrical conductor 11 and an elastomer sealing body 12, which is thus connected by integral bonding, e.g., scorched, are shown in FIGS. 11 through 14 and 15 through 18. The conductor 11 is, for example, strip-like (see FIG. 13) and, in a central region comprising the first sealing section 13, and at least in the region of the sealing body 12, has roundings 19 of the outer contour 29. The sealing body 12 fully surrounds the electrical conductor 11, i.e., around the entire circumference of the electrical conductor 11.

In the embodiments according to FIGS. 11 through 18, the sealing body 12 is trapezoidal in a longitudinal section through the electrical conductor 11, as shown in FIGS. 12 and 16. At least one angle of inclination α, and preferably both angles of inclination α, α', of the sealing body 12 or of the trapezoid against a surface normal is preferably in the range between 10° and 40°, and more preferably in the range between 15° and 30°, and is, for example, 20°. The two angles of inclination α, α' of the sealing body 12 or of the trapezoid are preferably the same, so that the sealing body has the shape of an isosceles trapezoid. However, the two angles of inclination α, α' of the sealing body 12 or of the trapezoid can also be different. The ratio of width to height of sealing body 12 in longitudinal section (see FIG. 12) is preferably in the range between 1.5 and 6, more preferably between 2 and 5, and even more preferably between 2.5 and 4.5, and is, for example, 3.8.

The embodiment according to FIGS. 15 through 18 differs from the embodiment according to FIGS. 11 through 14 in that the sealing body 12 has two partial bodies 12A, 12B spaced apart from one another in the longitudinal direction of the electrical conductor 11, as a result of which a recess or groove 17 is formed between the partial bodies 12A, 12B similar to the embodiment according to FIG. 5.

The partial bodies 12A, 12B are, advantageously, each trapezoidal, with inclination angles as described above. Advantageously, the partial bodies 12A, 12B are of the same shape, but can also be of different shapes. The ratio of width B1, B2 to height H of each partial body 12A, 12B is preferably in the range between 1 and 3, and more preferably between 1 and 2, and is, for example, 1.5. The ratio of width BN of the groove to the height H of the sealing body 12, or the average height of the partial bodies 12A, 12B, is preferably in the range between 0.2 and 1, and more preferably in the range between 0.5 and 1, and is, for example, 0.8. The ratio of the depth TN of the groove to the height H of the sealing body 12, or the averaged height of the partial bodies 12A, 12B, is preferably at least 0.2, more preferably at least 0.5, and even more preferably at least 0.8, and is, for example, 1, i.e., that the groove base is formed by the electrical conductor 11. The aforementioned value ranges for the widths, heights, and depths of the sealing body 12, the partial bodies 12A, 12B. and the groove 17 have proven to be particularly advantageous with regard to sealing effect and simple production.

The widths B, B1, B2 of the trapezoidal profiles are determined at half the height of the sealing body 12.

For electrical contacting, the electrical conductor 11 advantageously has a contacting element 31 at both ends—for example, in the form of a bore through the electrical conductor 11.

LIST OF REFERENCE SIGNS

10 Housing part
11 Electrical conductor
12 Sealing body
13 First sealing section
14 Second sealing section
15 Third sealing section
16 Static housing seal
17 Grooves
18 Screws
19 Roundings
20 Latching hook
21 Stop
22 Sealing beads
23 Opening
28 Rectangular outer contour
29 Rounded outer contour
30 Sealing section
31 Contacting elements
40 Composite component

The invention claimed is:

1. An electrical conductor for conducting electric current through a housing part, wherein
    the electrical conductor is enclosed in a first sealing section by a sealing body made of an elastic material, and
    the electrical conductor and the sealing body have an integrally-bonded connection, wherein
    the electrical conductor has, at least in the first sealing section, an outer contour which is rounded in cross-section, and wherein the electrical conductor has on at least one end an outer contour which is angular in cross-section.

2. The electrical conductor according to claim 1, wherein the electrical conductor, at least in a sealing section between the housing part and the electrical conductor, has an outer contour which is rounded in cross-section.

3. The electrical conductor according to claim 1, wherein the elastic material of the sealing body is an elastomer which is impermeable to oil.

4. The electrical conductor according to claim 1, wherein the elastic material of the sealant consists of a combination of several elastomers which are connected to one another in layers.

5. The electrical conductor according to claim 1, wherein the elastic material of the sealing body has a barrier layer made of fluorothermoplastics.

6. The electrical conductor according to claim 1, wherein the sealing body has on its outer side at least one circumferential groove and/or at least one latching hook and/or at least one stop.

7. The electrical conductor according to claim 1, wherein the electrical conductor is fed through an opening in a housing part, wherein the sealing body fixes the electrical conductor in the opening of the housing part.

8. The electrical conductor according to claim 1, wherein the sealing body is supported on the inner surface of the opening and on both sides of the housing part.

9. The electrical conductor according to claim 1, wherein the sealing body extends further on the conductor on one side or on both sides of the first sealing section.

10. The electrical conductor according to claim 1, wherein the conductor is fed through a housing part, wherein the sealing body is completely enclosed by the housing part and, on the first sealing section, by the conductor, and wherein the housing part completely encloses the conductor in a second and a third sealing section, each of which adjoins the first sealing section on one side.

11. The electrical conductor according to claim 1, wherein the outer contour, in cross-section of the electrical conductor, has curvatures with a radius of at least 0.1 mm.

12. A composite component having an electrical conductor according to claim 1 and a sealing body made of an elastic material and connected by integral bonding to the electrical conductor, wherein the sealing body is trapezoidal in a longitudinal section through the electrical conductor.

13. The composite component according to 12, wherein the at least one angle of inclination ($\alpha$, $\alpha'$) of the trapezoidal sealing body is in the range between 10° and 40°.

14. The electrical conductor according to claim 1, wherein the outer contour, in cross-section of the electrical conductor, has curvatures with a radius of at least 0.4 mm.

15. The electrical conductor according to claim 1, wherein the outer contour, in cross-section of the electrical conductor, has curvatures with a radius of at least 0.7 mm.

* * * * *